United States Patent
Balakrishnan et al.

(10) Patent No.: US 8,364,898 B2
(45) Date of Patent: Jan. 29, 2013

(54) OPTIMIZING A CACHE BACK INVALIDATION POLICY

(75) Inventors: Ganesh Balakrishnan, Apex, NC (US); Anil Krishna, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 1043 days.

(21) Appl. No.: 12/358,873

(22) Filed: Jan. 23, 2009

(65) Prior Publication Data

US 2010/0191916 A1   Jul. 29, 2010

(51) Int. Cl.
 G06F 12/00 (2006.01)
 G06F 13/00 (2006.01)
 G06F 13/28 (2006.01)
(52) U.S. Cl. ........ 711/133; 711/122; 711/129; 711/134; 711/136; 711/E12.069; 711/E12.071; 711/E12.076; 711/E12.077
(58) Field of Classification Search ........................ None
See application file for complete search history.

(56) References Cited

U.S. PATENT DOCUMENTS

| | | | | |
|---|---|---|---|---|
| 4,797,814 A * | 1/1989 | Brenza | | 711/3 |
| 6,202,129 B1 * | 3/2001 | Palanca et al. | | 711/133 |
| 6,240,489 B1 * | 5/2001 | Durham et al. | | 711/136 |
| 6,704,845 B2 | 3/2004 | Anderson et al. | | |
| 6,868,485 B1 * | 3/2005 | Conway | | 711/154 |
| 6,959,364 B2 * | 10/2005 | Safranek et al. | | 711/146 |
| 7,096,323 B1 * | 8/2006 | Conway et al. | | 711/147 |
| 7,373,466 B1 * | 5/2008 | Conway | | 711/156 |
| 7,669,009 B2 * | 2/2010 | Kottapalli et al. | | 711/122 |
| 7,925,834 B2 * | 4/2011 | Smith et al. | | 711/125 |
| 2003/0135696 A1 * | 7/2003 | Rankin et al. | | 711/136 |
| 2003/0159003 A1 * | 8/2003 | Gaskins et al. | | 711/128 |
| 2004/0003184 A1 * | 1/2004 | Safranek et al. | | 711/146 |
| 2004/0078526 A1 * | 4/2004 | Zhang | | 711/134 |
| 2004/0143708 A1 * | 7/2004 | Caprioli | | 711/136 |
| 2005/0071566 A1 * | 3/2005 | Adl-Tabatabai et al. | | 711/128 |
| 2005/0235115 A1 | 10/2005 | Franaszek et al. | | |
| 2006/0064547 A1 * | 3/2006 | Kottapalli et al. | | 711/133 |
| 2007/0005899 A1 | 1/2007 | Sistla et al. | | |
| 2008/0215820 A1 * | 9/2008 | Conway | | 711/141 |
| 2008/0320235 A1 * | 12/2008 | Beckmann et al. | | 711/144 |
| 2009/0043966 A1 * | 2/2009 | Shen et al. | | 711/122 |
| 2009/0083489 A1 * | 3/2009 | Clark et al. | | 711/129 |

OTHER PUBLICATIONS

Ghasemzadeh et al., "Modified Pseudo LRU Replacement Algorithm", Jun. 2006, IEEE, Proceedings of the 13th Annual IEEE International Symposium and Workshop on Engineering of Computer Based Systems (ECBS'06), pp. 1-6.*

* cited by examiner

*Primary Examiner* — Edward Dudek, Jr.
*Assistant Examiner* — Matthew Chrzanowski
(74) *Attorney, Agent, or Firm* — Yudell Isidore Ng Russell PLLC

(57) ABSTRACT

A method and a system for utilizing less recently used (LRU) bits and presence bits in selecting cache-lines for eviction from a lower level cache in a processor-memory sub-system. A cache back invalidation (CBI) logic utilizes LRU bits to evict only cache-lines within a LRU group, following a cache miss in the lower level cache. In addition, the CBI logic uses presence bits to (a) indicate whether a cache-line in a lower level cache is also present in a higher level cache and (b) evict only cache-lines in the lower level cache that are not present in a corresponding higher level cache. However, when the lower level cache-line selected for eviction is also present in any higher level cache, CBI logic invalidates the cache-line in the higher level cache. The CBI logic appropriately updates the values of presence bits and LRU bits, following evictions and invalidations.

12 Claims, 11 Drawing Sheets

The Prior Art

OPTIMIZING A CACHE BACK INVALIDATION POLICY

BACKGROUND

1. Technical Field

The present invention generally relates to cache memory systems and in particular to replacement policies of cache coherence systems.

2. Description of the Related Art

Caches are typically organized in a set-associative fashion, with each cache divided into a certain number of "sets". Each set holds one or more cache-lines arranged in one or more "ways" (also referred to herein as "cache-ways"). Each cache set has Least Recently Used (LRU) bits associated with the cache set that describes the level of recent use of each cache-line within a cache set. These LRU bits are used to make replacement decisions when removing a line from a cache set, in order to make space for a new line. In addition, each cache-line may have other associated state bits. For example, if the cache participates in the coherence protocol (for example, the Modified Exclusive Shared Invalid (MESI) protocol), the cache maintains the coherence protocol state bits per cache-line.

Caches are often hierarchically organized into multiple levels, e.g., include Level 1 caches (L1) and Level 2 caches (L2). Typically, in a multi-processor system (or a processor designed with the intent of being usable in a multi-processor system), "inclusion" is maintained between cache levels. Inclusion means that all the data stored in a higher level cache is also present in a lower level cache. For example, all data in the (higher level) L1 caches are present in the (lower level) L2 cache that the L1s share. The main motivation for inclusion is that inclusion makes cache coherency easier to manage. A request from the bus may initiate an inspection/search of a lower level cache only and, as a consequence of inclusion, the search is certain to encounter any data that the higher level caches may contain.

In the example of an L2 shared by multiple L1 caches, inclusiveness requires that upon replacement of a cache line in the L2, the line is consequently invalidated in the L1s that share the L2. The invalidation of the cache-line in the L1 is called back-invalidation. Since the size of an L2 is typically much larger than the combined sizes of all the L1s that share the L2, most back-invalidation messages may end up searching the L1 for a line that the L1 does not have.

In general, the traditional cache replacement policies result in performance degrading back-invalidation caused by the policies' eviction of hot cache-lines from caches closer to cores (e.g. L1) due to back-invalidation from inclusive caches that are further from the cores (e.g. L2).

SUMMARY OF ILLUSTRATIVE EMBODIMENTS

Disclosed are a method and a system for utilizing less recently used (LRU) bits and presence bits in selecting cache-lines for eviction from a lower level cache in a processor-memory sub-system. A cache back invalidation (CBI) logic utilizes LRU bits to evict only cache-lines within a LRU group, following a cache miss in the lower level cache. In addition, the CBI logic uses presence bits to (a) indicate whether a cache-line in a lower level cache is also present in a higher level cache and (b) evict only cache-lines in the lower level cache that are not present in a corresponding higher level cache. However, when the lower level cache-line selected for eviction is also present in any higher level cache, CBI logic invalidates the cache-line in the higher level cache. The CBI logic appropriately updates the values of presence bits and LRU bits, following evictions and invalidations.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
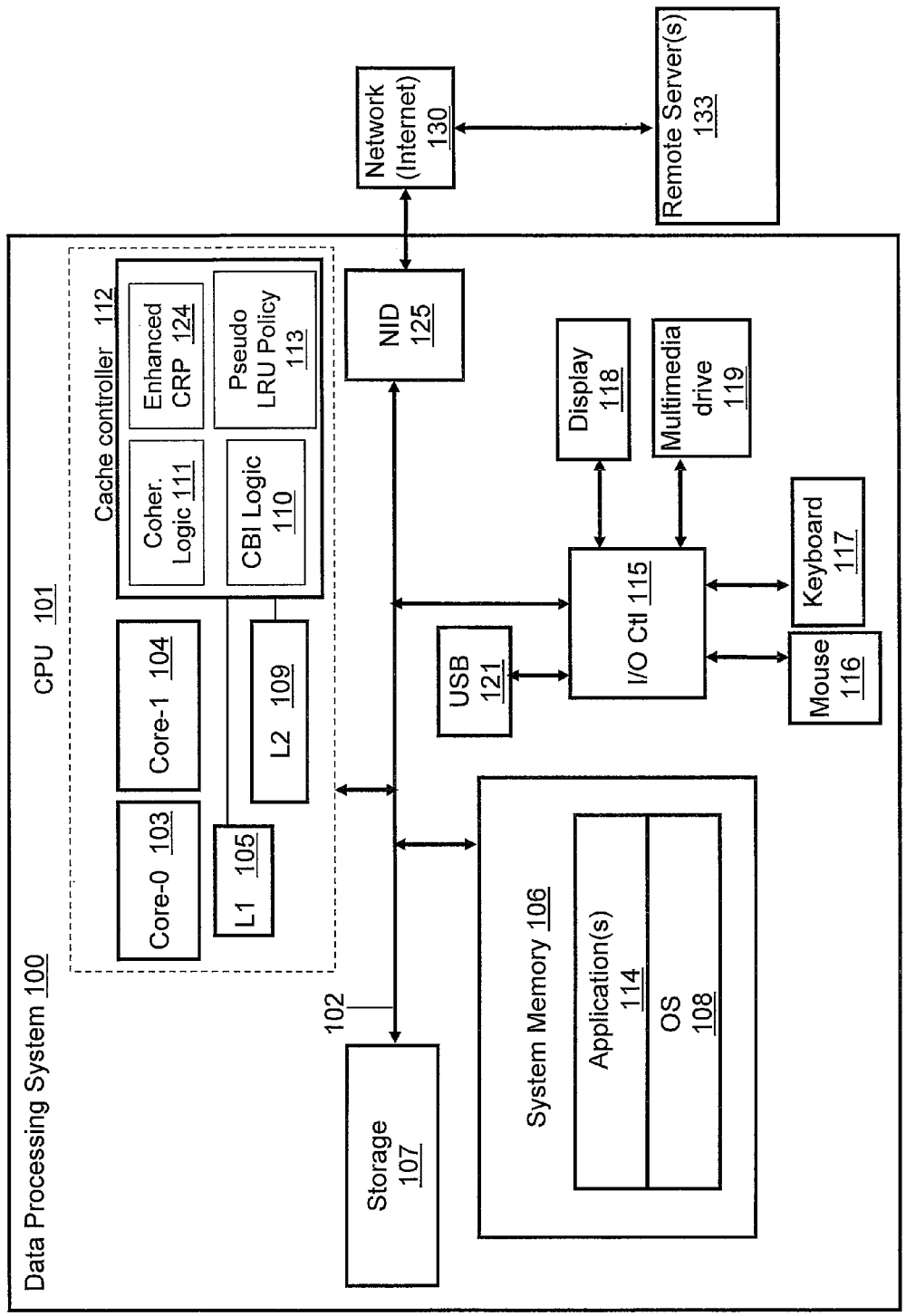
FIG. 1 provides a block diagram representation of an example data processing system within which the invention is practiced, according to one embodiment of the invention.

The illustrative embodiments provide a method and a system for utilizing less recently used (LRU) bits and presence bits in selecting cache-lines for eviction from a lower level cache in a processor-memory sub-system. A cache back invalidation (CBI) logic utilizes LRU bits to evict only cache-lines within a LRU group, following a cache miss in the lower level cache. In addition, the CBI logic uses presence bits to (a) indicate whether a cache-line in a lower level cache is also present in a higher level cache and (b) evict only cache-lines in the lower level cache that are not present in a corresponding higher level cache. However, when the lower level cache-line selected for eviction is also present in any higher level cache, CBI logic invalidates the cache-line in the higher level cache. The CBI logic appropriately updates the values of presence bits and LRU bits, following evictions and invalidations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) connected to system memory 106 via system interconnect/bus 102. In particular, CPU 101 is illustrated with two (2) processing cores, Core-0 103 and Core-1 104. CPU 101 further comprises at least one higher level cache of which L1 105 is illustrated. Illustrated within CPU 101 is lower level cache L2, 109. Illustrated within L2 109 are presence bits 135. Cache controller 112, which controls access to L1 105 and L2 109, is also illustrated within CPU 101.

DPS 100 is also illustrated with a network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 133, which may also provide data/instructions/code for execution on DPS 100, in one embodiment. In particular, NID 125 may enable connectivity between components of a distributed system having shared processor and memory resources.

Various features of the invention are also completed/supported via code or logic stored within cache controller 112. Thus, for example, illustrated within cache controller 112 are a number of logic components, including Coherence Protocol Logic 111, Pseudo-LRU Policy 113, Enhanced Cache Replacement Policy (CRP) 124 and Cache Back-Invalidation (CBI) logic 110. In actual implementation, CBI logic 110 may be combined with Coherence Protocol 111, Pseudo-LRU Policy 113 and Enhanced Cache Replacement Policy (CRP) 124 to provide a single executable component, collectively providing the various functions of each individual logic component, when the corresponding combined logic is executed by cache controller 112. For simplicity, CBI logic 110 is illustrated and described as a stand alone or separate logic component, which provides specific functions, as described below.

Cache Controller 112 executes CBI logic 110. Certain functions supported and/or implemented by CBI logic are executed by cache controller 112 and/or device hardware to complete the implementation of that function. For simplicity of the description, the collective body of logic that enables these various features is referred to herein as CBI logic 110. Among the instructions/logic provided by CBI logic 110, and which are specific to the invention, are: (a) code/logic for detecting a data request at a lower level cache; (b) code/logic for selecting for eviction a cache-line from the lower level cache by using presence bits and LRU bits; (c) code/logic for updating LRU bits and presence bits; and (d) code/logic for invalidating a copy of the cache-line that is present in the higher level cache when the cache-line is selected for eviction. According to the illustrative embodiment, when cache controller 112 executes CBI logic 110, CPU 101 and/or DPS 100 initiates a series of functional processes that enable the above functional features as well as additional features/functionality. These features/functionality are described in greater detail below within the description of FIGS. 3-10.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
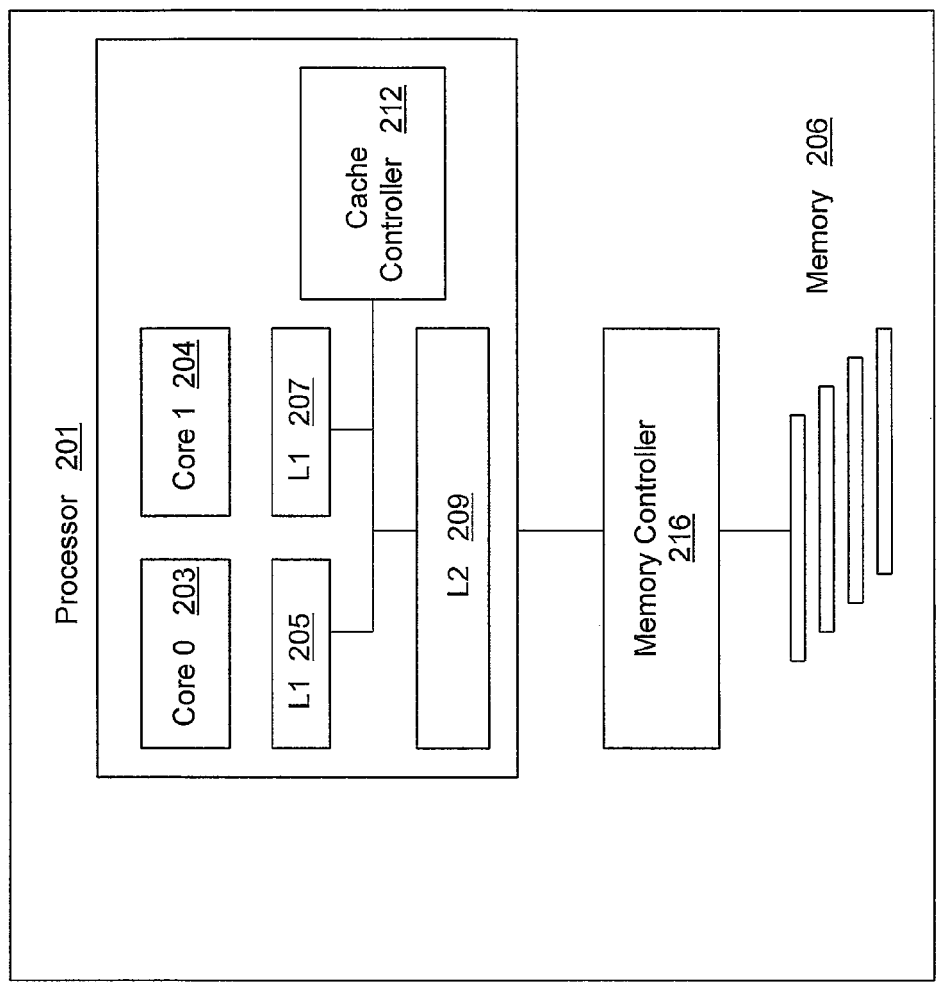
FIG. 2 illustrates an example of a traditional cache replacement policy in a processor memory sub-system, according to the prior art.

FIG. 2 illustrates a processor and memory-subsystem, according to the prior art. System 200 comprises processor 202 which further comprises two cores, Core-0 203 and Core-1 204. Illustrated within processor 202 is first L1 205, the independent higher level cache of Core-0 203. Second L1 207 represents the independent higher level cache of Core-1 204. Also illustrated within processor 202 is lower level (L2) cache 209. L2 cache 209 is shared by Core-0 203 and Core-1 204. In addition, cache controller 212 is illustrated within processor 202. Processor 202 connects to the memory subsystem (comprising memory controller 216 and memory 206 to which access is controlled by memory controller 216) via a memory bus.

In traditional cache eviction policies, selection of the cache-line for eviction is based upon identifying the LRU line. System 200 illustrates an example of processor 201 with two cores, Core-0 203 and Core-1 204. System 200 has L2 209 that is shared by a pair of L1s, first L1 205 and second L1 207, respectively, and may be used to highlight performance issues with traditional cache eviction policies.

When one of the cores, say core-0 203, runs a workload that is cache-intensive and core-0's data set fits in L1 205, the data remains "hot" (i.e., is actively fetched) in L1 205. However, the data starts "cooling" (i.e., is infrequently fetched) in L2 209 because the LRU bits in L2 209 are never updated (because the data is always hit in core-0's L1 205). As a result, the chances of eviction of core-0's hot data from L2 209 are increased. In addition, the chance of eviction of the same/replicated data from the L1 205 (due to back-invalidation) is also increased because core0's data in L2 209 is not recent. When core-1 204 runs a workload that has a large working set, continuous fetching of new lines into L2 209 and core-1's (second) L1 207 occurs. As a result, core-1's data becomes more recent in L2 than core-0's data, eventually causing eviction of core-0's data from L2 209 and core-0's L1 205 due to back-invalidation. So, even though the data is heavily reused by core-0 203, core-0's data gets evicted because core-1 204 "hogs" L2 209 (i.e., core-1 204 actively initiates the majority of operations within L2 209). Consequently, the workload on core-0 203 pays a significant performance penalty because core-0 203 experiences a lot of cache misses even though core-0 203 is actually very cache friendly (i.e., core-0 203 actively fetches data from L1 205).

In general, the traditional cache replacement policies results in performance degrading back-invalidation caused by the policies' eviction of hot cache-lines from caches closer to cores (e.g. L1 205) due to back-invalidation from inclusive caches that are further from the cores (e.g. L2 209).

Figure 3A:
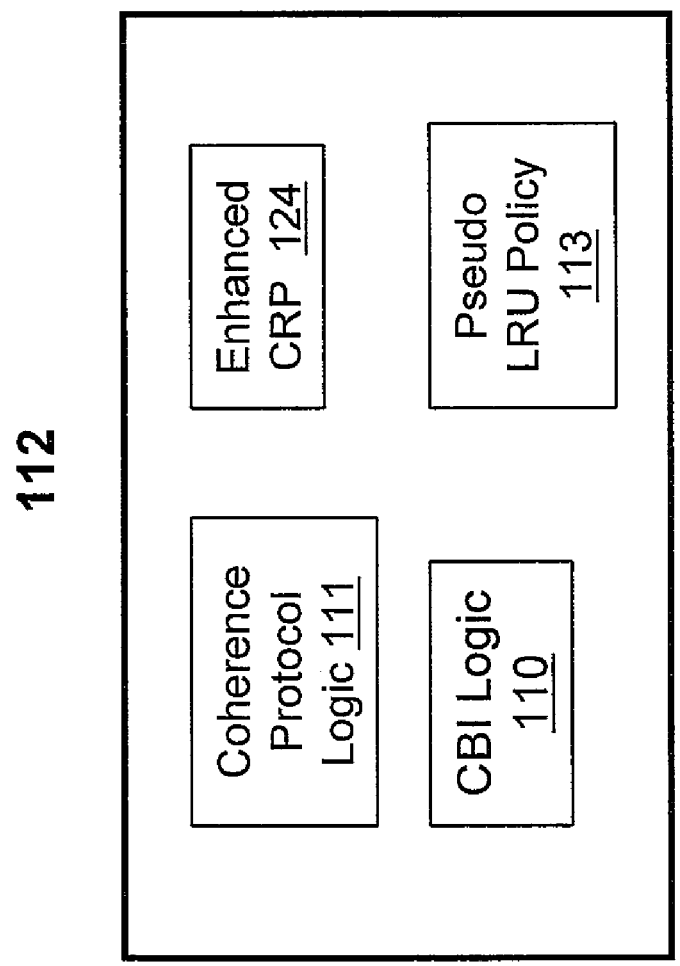
FIG. 3A illustrates an example cache controller, according to one embodiment of the invention.

FIG. 3A illustrates logic components of a cache controller, according to one embodiment of the invention. Cache Controller 112 comprises multiple logic components which enable enhanced cache replacement and back-invalidation policies. In particular, cache 112 comprises Coherence Protocol Logic 111, Pseudo-LRU Policy 113, Enhanced Cache Replacement Policy (CRP) 124 and Cache Back-Invalidation (CBI) logic 110.

Figure 3B:
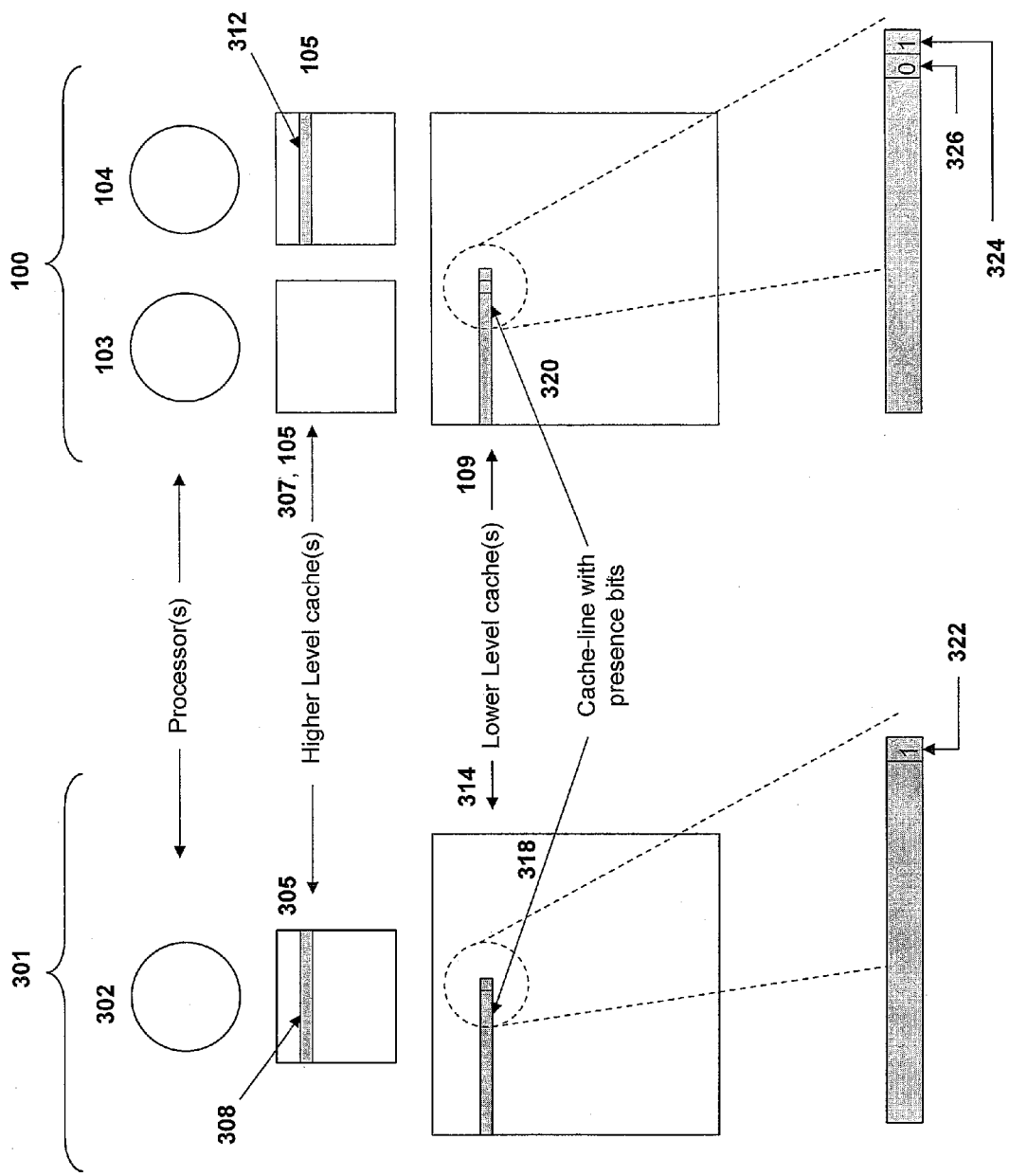
FIG. 3B illustrates the use of presence bits in a cache hierarchy, according to one embodiment of the invention.
Figure 8:
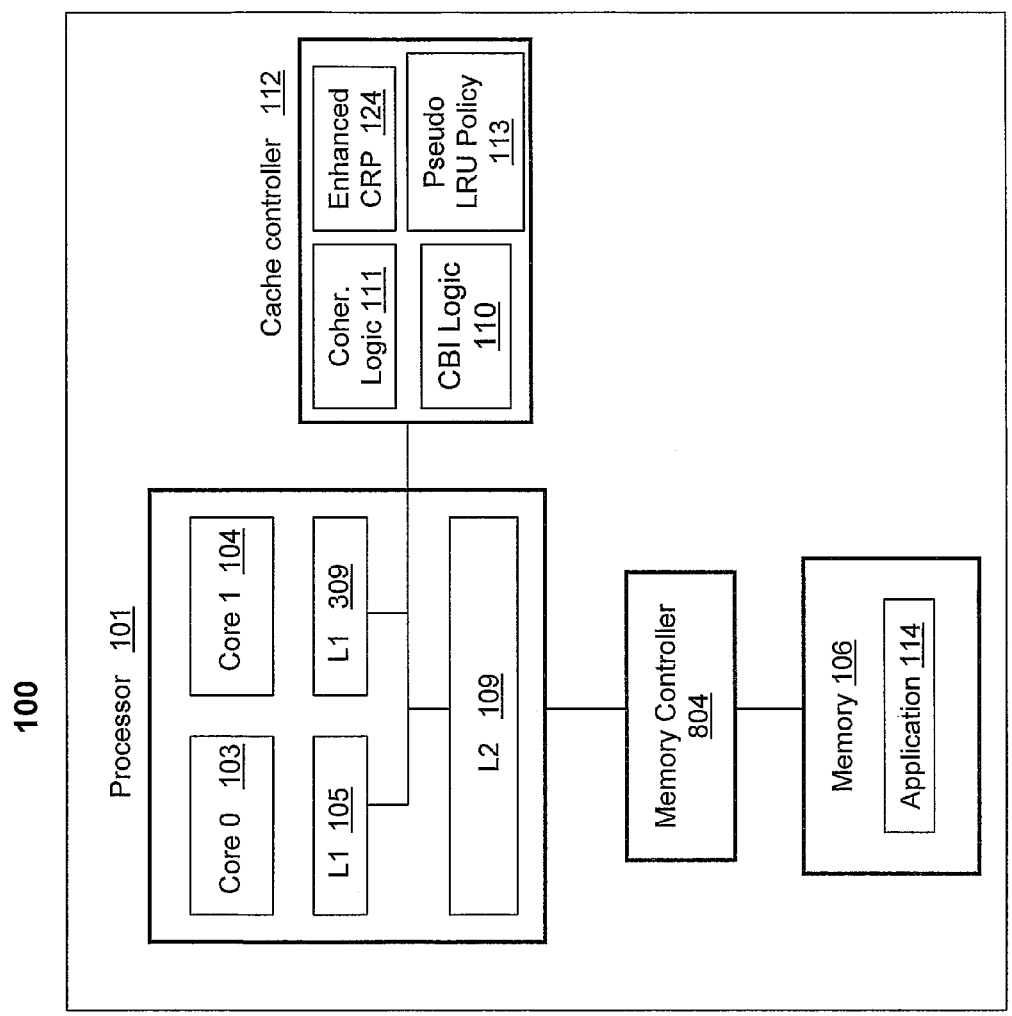
FIG. 8 illustrates a cache replacement policy which uses presence bits in the lower level cache to reduce back-invalidate traffic in a processor and memory-subsystem, according to one embodiment of the invention.
Figure 9:
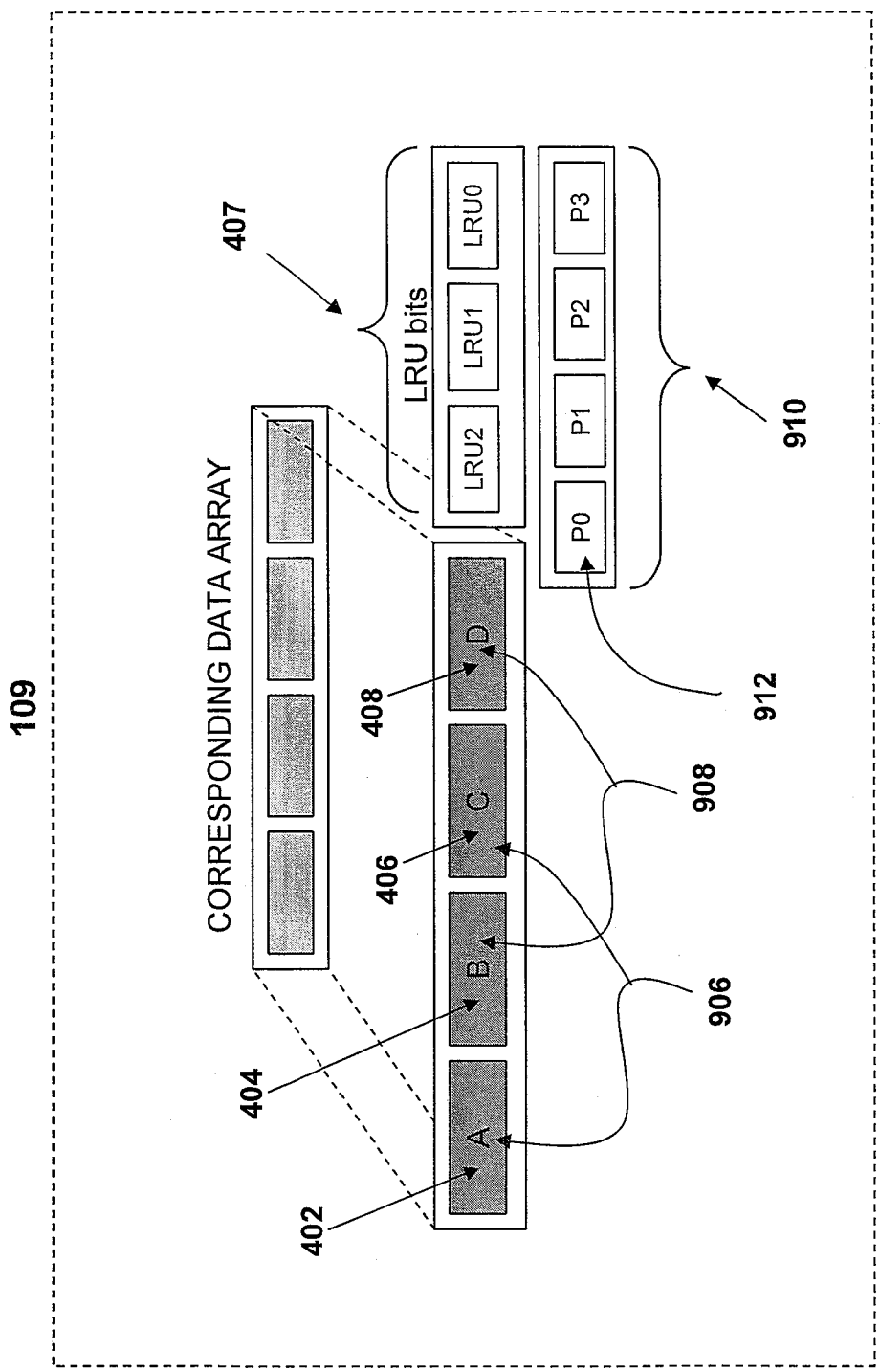
FIG. 9 illustrates the use of Pseudo LRU bits and presence bits in selecting cache-lines for eviction, according to one embodiment of the invention.
Figure 10:
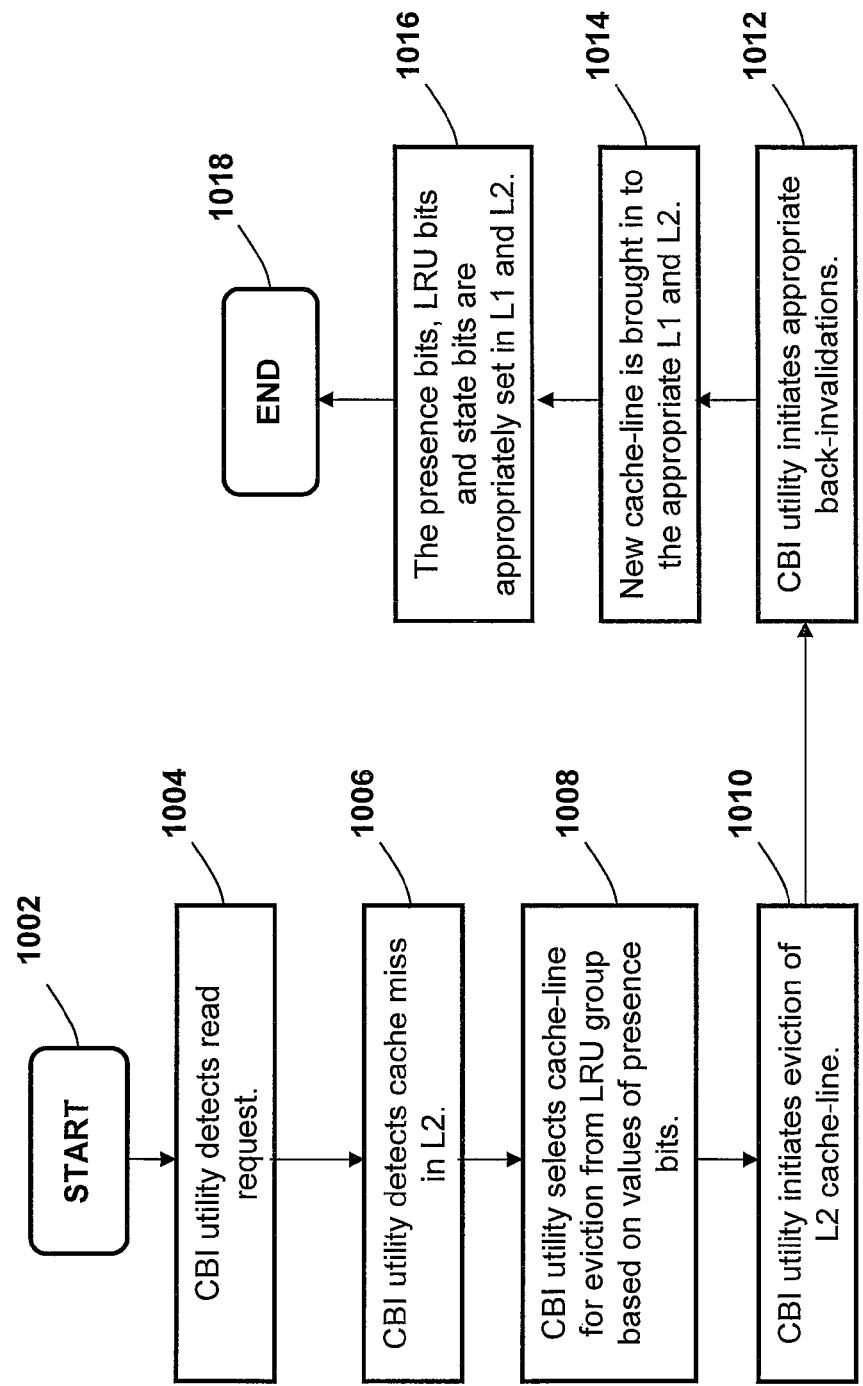
FIG. 10 is a flow chart illustrating the process of executing cache replacement and back-invalidation policies that incorporate the use of presence bits, according to one embodiment of the invention.

Coherence Protocol Logic 111 provides functions necessary to maintain "inclusion" between cache levels, wherein inclusion facilitates cache coherency. The description of FIG. 3B provides further discussion of "inclusion", "back-invalidation" and "cache coherency" with the use of presence bits. Pseudo-LRU Policy 113 which indicates how recently a cache-line in a cache set is used is further discussed in FIGS. 4-7. Collectively, Enhanced Cache Replacement Policy (CRP) 124 and Cache Back-Invalidation (CBI) logic 110 provide an enhanced replacement policy and an enhanced back-invalidation policy as illustrated in FIGS. 8-10, described below.

FIG. 3B illustrates the use of presence bits in a cache hierarchy, according to one embodiment of the invention. FIG. 3B comprises DPS 301 and DPS 100. As shown in DPS 100 and DPS 301, caches may be hierarchically organized into multiple levels including Level 1 caches (L1) and Level 2 caches (L2). In a multi-processor system (or a processor designed with the intent of being usable in a multi-processor system), inclusion is maintained between cache levels. This means that all the data stored in a higher level cache is also present in a lower level cache. For example, all data in the L1 caches is present in the L2 cache that the L1s share.

Inclusion makes cache coherency easier to manage. A request from the bus may initiate an inspection/search of a lower level cache only and, as a consequence of inclusion, the search is certain to encounter any data that the higher level caches may contain. The example of FIG. 3B illustrates an L2 shared by a few L1 caches and facilitates a description of inclusion within a cache hierarchy. Inclusiveness imposes that upon replacement of a cache line in the L2, the line is invalidated in the L1s that share the L2. This is called back-invalidation. Cache Back-Invalidation (CBI) logic 110, with the aid of Coherence Protocol Logic 111, reduces back-invalidation traffic by utilizing "presence bits" maintained in L2s to indicate which L1s do have the cache line. In DPS 301, L1 305 is the only higher level cache associated with L2 306. In this case only 1 presence bit 309 maintained within cache-line 307 is required in L2 306. In DPS 100, there are two (2) L1s (L1 311, L1 105) sharing L2 109. Two (2) presence bits (324, 326) are maintained in L2 109 per cache-line with a first presence bit assigned to L1 311 and a second bit assigned to L1 105. In DPS 100, the highlighted cache-line (320) of L2 109 is present in L1 105 (illustrated as cache-line 312) and not in L1 311. Therefore, the presence bits respectively indicate the presence of a particular cache-line in a higher level cache. When the highlighted cache-line (320) in L2 109 needs to be replaced, a back-invalidate needs to be sent only to L1 105, which has the line, as indicated by the presence bits. In particular, first presence bit-2 326 has a value of "0" indicating that no back-invalidate is sent to corresponding L1 307, whereas second presence bit-2 324 has a value of "1" indicating that a back-invalidate is sent to corresponding L1 105. Therefore, using the presence bits only, the necessary back-invalidates need to be sent to the L1s. Of course, to keep the presence bits up to date in the L2, upon an L1 replacement the corresponding presence bits are re-set in the L2. To keep the impact of this extra traffic to the L2 low and to enable parallel data access due to (a) the L1 miss and (b) the update of the "presence bits" due to the replacement, presence bits may be maintained in a separate structure within the L2.

Figure 4:
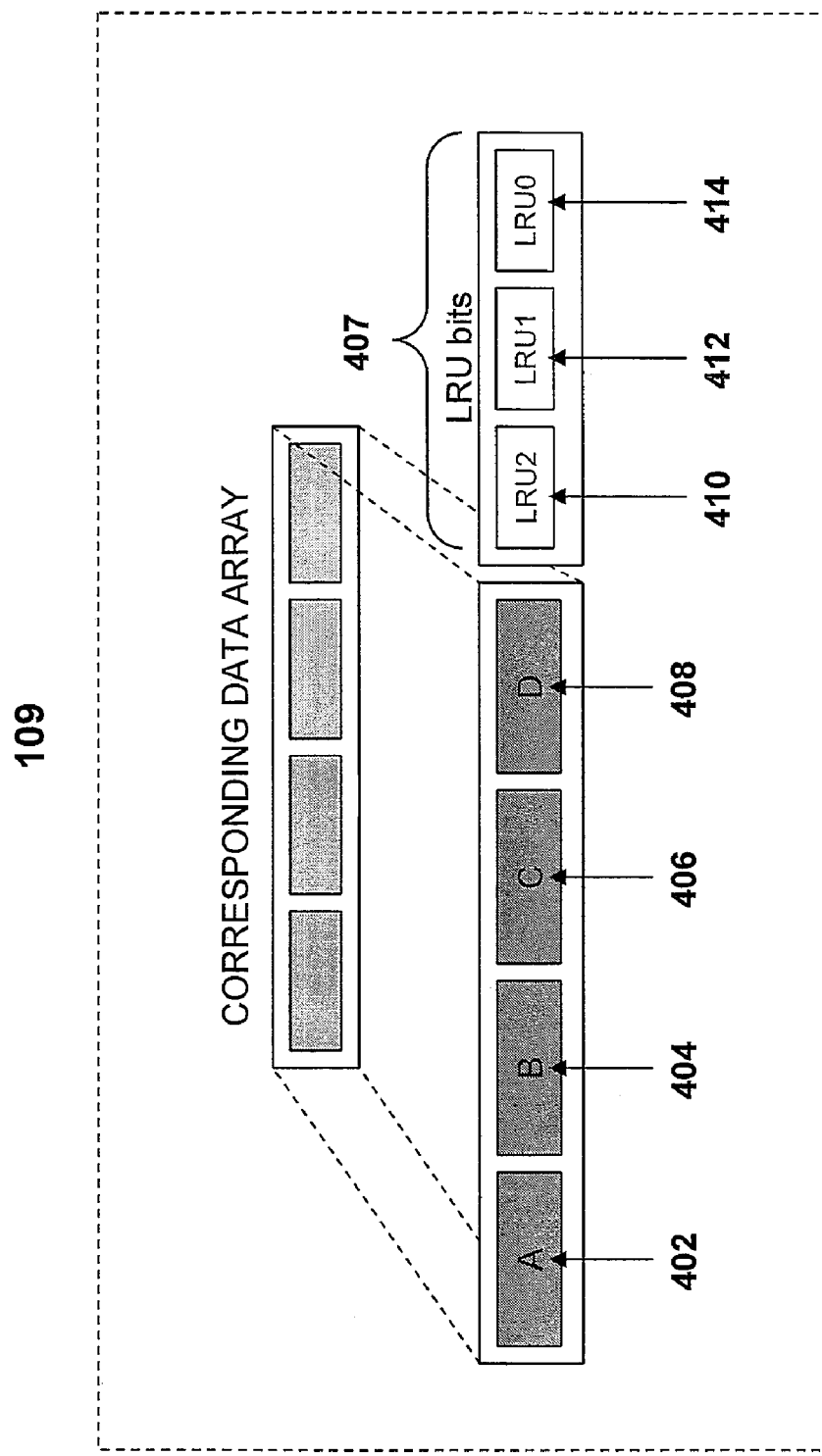
FIG. 4 illustrates the use of LRU and Pseudo LRU bits within a processor cache set, according to one embodiment of the invention.

FIG. 4 illustrates the use of LRU and Pseudo LRU bits within a processor cache, according to one embodiment of the invention. L2 cache 109 comprises 4 "ways" illustrated by way-A 402, way-B 404, way-C 406 and way-D 408, respectively. L2 cache 109 also comprises LRU bits 407 further comprising LRU-2 410, LRU-1 412 and LRU-0 414. Also illustrated in L2 cache 109 are presence bits 135. A complete explanation of the purpose of presence bits 135 is provided within the detailed description of FIG. 9.

Pseudo-LRU is an approximation of True LRU used for the eviction of cache-lines. True LRU maintains a true ranking of how recently a cache-line in a cache set is used. True LRU uses "n multiplied by log2n" bits per set for an n-way cache because each of the n ways uses "log2n" bits to encode the corresponding ranking (which ranges in value from 0 through n−1). Pseudo-LRU uses "n−1" bits per set for an n-way cache. As illustrated, L2 cache 109 illustrates a single cache set within a 4-way cache. In L2 cache 109, 3 (i.e., n=4−1=3) bits are used per set to maintain "recency", i.e., a measure of recent use of a cache-line.

In a Pseudo-LRU policy/scheme (e.g., Pseudo-LRU Policy 113) with 4-ways, the scheme indicates 3 possibilities. Of the way pairs A-B and C-D, the policy indicates which way pair is more recently used. Of ways A 402 and B 404, the policy indicates which way is more recently used. Of ways C 406 and D 408, the policy indicates which way is more recently used. Thus, in this example of FIG. 4, Pseudo-LRU policy/scheme uses only 3 bits which are described as follows: LRU1 412 "remembers"/indicates which way-pair between pair A-B and pair C-D is LRU; LRU2 410 remembers which way between ways A 402 and B 404 is LRU; and LRU0 414 remembers which way between ways C 406 and D 408 is LRU.

LRU0 and LRU2 form, what may be termed, level-1 bits of Pseudo-LRU and LRU1 forms level-2 bits. Similarly, an 8-way cache requires 7 pseudo-LRU bits, with 4 bits in level-1, 2 bits in level-2 and 1 in level-3. The Pseudo-LRU concept similarly extends to higher levels of associativity, for example, to the level of associativities of a 32-way cache and a 64-way cache. As described herein, increasing levels of associativities provide higher levels of LRU bits. For example, level-3 LRU bits are at a higher level than level-2 LRU bits. Furthermore, level-2 LRU bits are at a higher level than level-1 LRU bits.

The following three illustrations (FIG. 5, FIG. 6 and FIG. 7) show modifications to the LRU bits in response to cache hits and cache misses.

Figure 5:
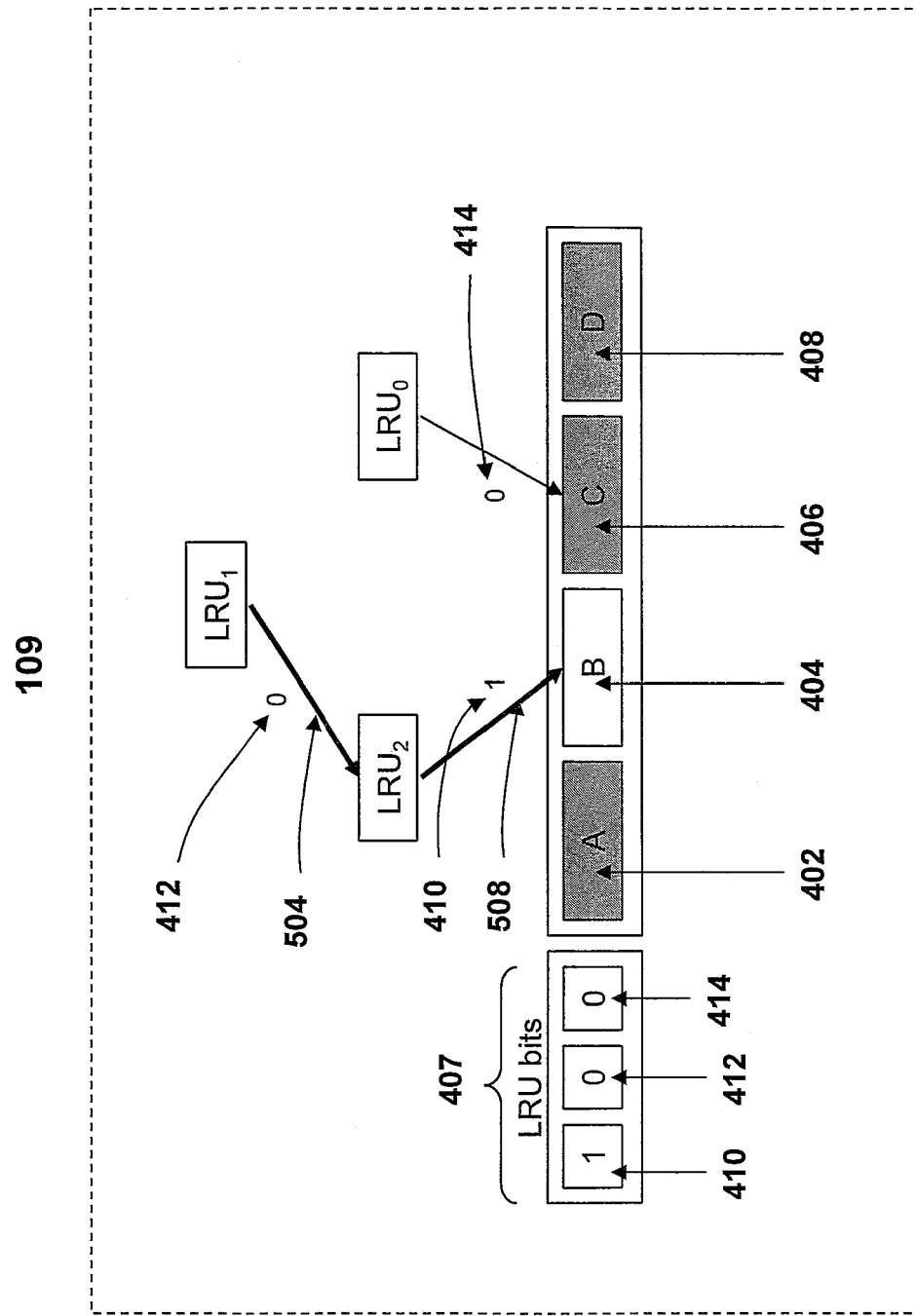
FIG. 5 illustrates the modification to LRU bits in response to a cache hit on a more recently used cache-line, according to one embodiment of the invention.

FIG. 5 illustrates the modification to LRU bits in response to a hit on a more recently used cache-line of a cache-way pair, according to one embodiment of the invention. In L2 109 of FIG. 5, bit indicators are used to indicate the meaning/value of the LRU bits. The bit indicators point towards less recently used regions of the cache set. In particular, the bit indicators depicted by indicator-1 504 and indicator-2 508, respectively lead to way B 404, indicating that way B 404 is the least recently used way according to pseudo-LRU bits 407. When a cache hit is detected in way A 402, there is no change to LRU bits 407 because way B 404 continues to be the least recently used way since way B 404 was previously and is currently the less recently used cache-way of a cache-way pair comprising way A 402 and way B 404.

In one embodiment, CBI logic 110 modifies/updates one or more of LRU bits 407 following the replacement of an evicted cache-line after a cache miss similar to the method in which updates are performed following a cache hit in the same cache-line. In either case involving (a) the replacement of a cache-line following eviction or (b) a cache hit on the cache-line, the cache-line represents the most recently used cache-line, following cache-line replacement or cache hit. Thus, the least recently used cache-line within the LRU group continues to be the least recently used way and there is no change to LRU bits 407.

Figure 6:
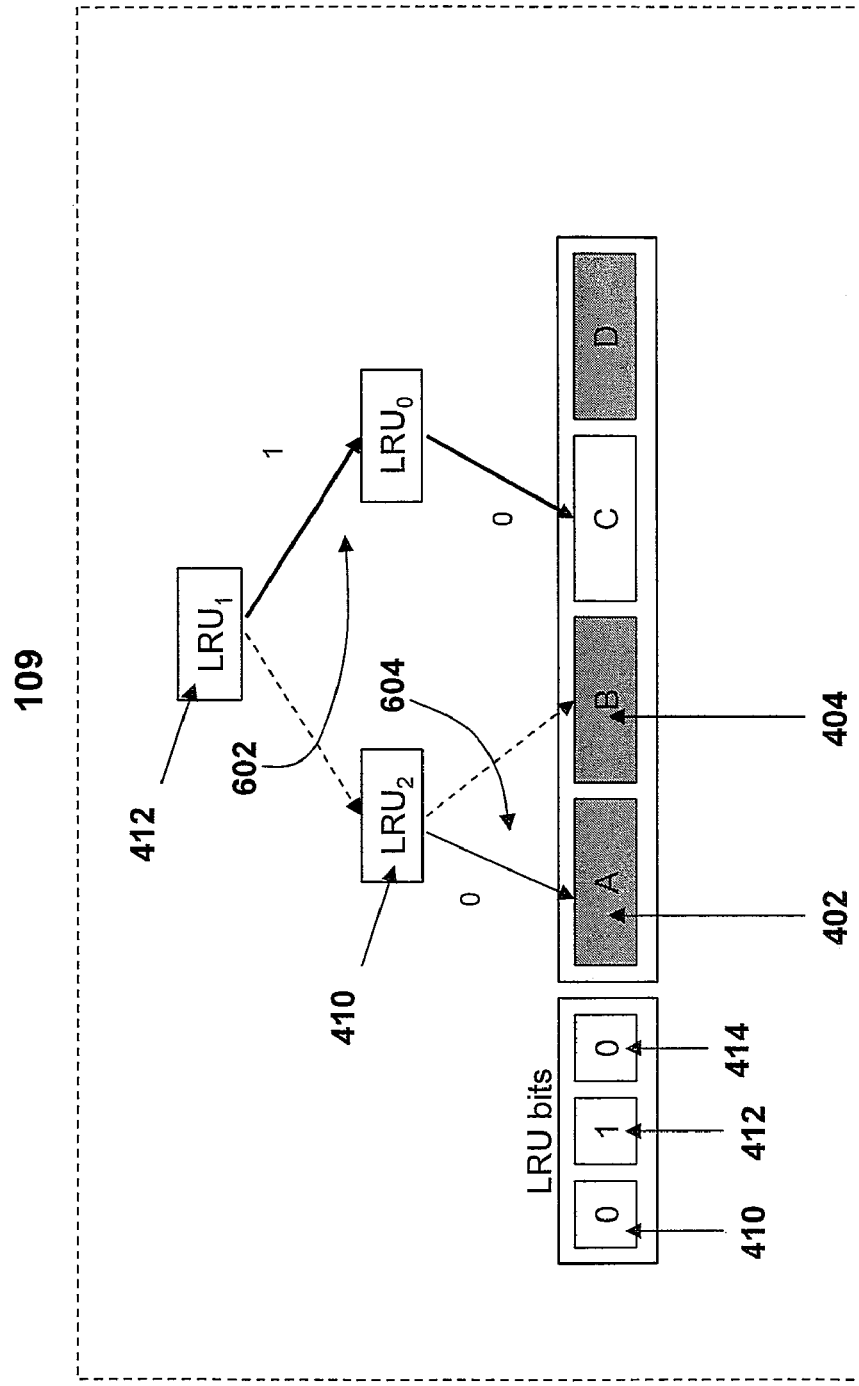
FIG. 6 illustrates the modification to LRU bits in response to a cache miss, according to one embodiment of the invention.

FIG. 6 illustrates the modification to LRU bits in response to a cache miss, according to one embodiment of the invention. In particular, FIG. 6 illustrates the modification to LRU bits in response to a cache miss and subsequent eviction of the least recently used cache-line. L2 109 of FIG. 6 illustrates a modified set of pseudo-LRU bits following a cache miss in L2 109 of FIG. 5. Since way B 404 contains the least recently used cache-line during the cache miss, the cache-line in way B 404 is evicted and replaced. As a result, way B 404 currently contains a line that is recently brought in, and therefore becomes the most recently used way. Hence LRU bits 407 are rearranged. All bits that lead to way B 404 are flipped, as illustrated by bit indicator-1 602 and bit indicator-2 604, respectively. The intent here is that since way B 404 is now the most recently used way, LRU2 410 points to way A 402. The value of LRU1 412 is flipped/changed to point to the less recently used cache-way pair.

Figure 7:
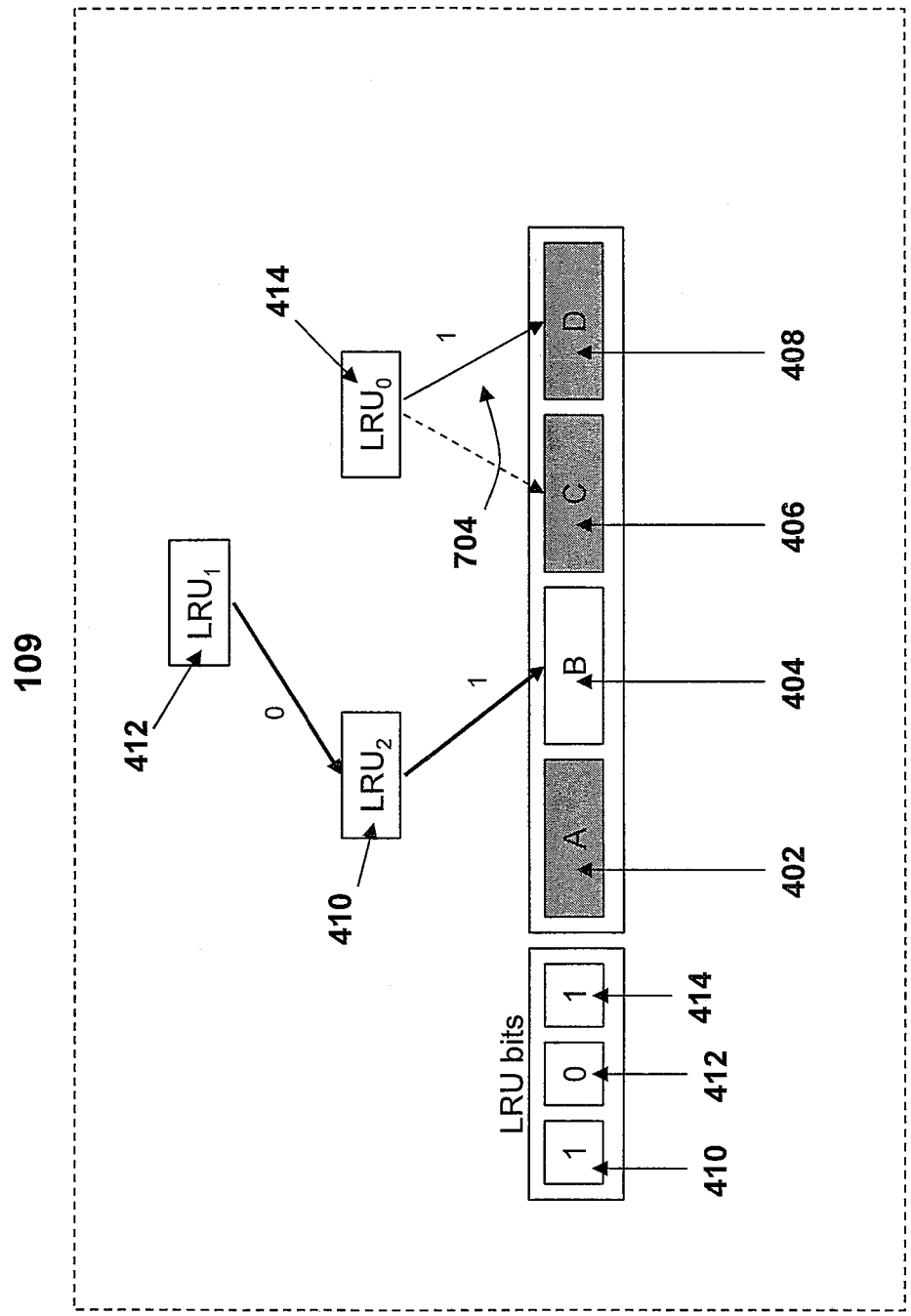
FIG. 7 illustrates the modification to LRU bits in response to a cache hit on a less recently used cache-line, according to one embodiment of the invention.

FIG. 7 illustrates the modification to LRU bits in response to a hit on a less recently used cache-line of a way pair, according to one embodiment of the invention. Similarly, FIG. 7 illustrates the modification to LRU bits in response to a cache miss and subsequent eviction of a cache-line from an LRU group, wherein the least recently used cache-line is not evicted. L2 109 of FIG. 7 illustrates a modified set of pseudo-LRU bits following (a) a cache hit on way C 406 in L2 109 of FIG. 5 or (b) the replacement of the cache-line in way C 406 with a new cache-line in way C 406 in L2 109 of FIG. 5. Way C 406 is a less recently used (LRU) cache-line but not the least recently used cache-line. Following the cache hit in way C 406 (or replacement of the cache-line in way C 406 with a new cache-line), way B 404 continues to be the least recently used way. Thus, in L2 109 of FIG. 7, LRU1 412 and LRU2 410, which lead to way B 404, are left unchanged. However, between ways C 406 and D 408, way C 406 is currently more recently used and hence the value of LRU0 414 is flipped/changed. Now LRU0 414 points to way D 408 which is indeed the less recently used way amongst way C 406 and D 408.

FIG. 8 illustrates an example processor and memory subsystem in which presence bits in the lower level cache are used to reduce back-invalidate traffic, according to one embodiment of the invention. DPS 100 comprises processor 101 which further comprises two cores, Core-0 103 and Core-1 104. Coupled to Processor 101 is first L1 105, the independent higher level cache of Core-0 103. Second L1 309 represents the independent higher level cache of Core-1 104. Also illustrated within DPS 100 is lower level (L2) cache 109. Illustrated within L2 cache 109 are presence bits 135. A complete explanation of the purpose of presence bits 135 is provided within the detailed description of FIG. 9. L2 cache 109 is shared by Core-0 103 and Core-1 104. DPS 100 also includes cache controller 112. Cache 112 comprises Coherence Protocol Logic 111, Pseudo-LRU Policy 113, Enhanced Cache Replacement Policy (CRP) 124 and Cache Back-Invalidation (CBI) logic 110. Controlling access to memory 106 is memory controller 804. Memory 106 has example application 114 that generates or requests data that may be located in memory. The data may also be located via cache-lines in the cache which provides quicker access to the data during processing.

The optimized cache replacement/eviction policy may be described with reference to DPS 100. The optimized replacement policy also applies to systems which may include cache levels which are lower than the L2 cache level (L3 caches, for example). The optimized replacement policy is described in relation to the LRU policy.

When a core (e.g., Core-0 103) initiates a read request for data, CBI logic 110 executes the data search as outlined in the following enumerated steps.

(1) CBI logic 110 searches for the data in L1 105. If data is available or the request "hits" in L1 105, then
   (A) The data is read into the core's internal registers.
   (B) The LRU bits and state bits for the cache-line are updated in L1 105.
   (C) CBI logic 110 makes no changes to the presence bits and concludes the data search in L1 105.

(2) If a cache miss occurs in L1 105, CBI logic 110 searches for the data in L2 109. If data is available in L2 109, then
   (A) Data is copied into the corresponding L1 105 by evicting the Least Recently Used cache-line of L1 105.
   (B) Data is copied into the core's internal registers for further use.
   (C) LRU bits and state bits for the cache-line that is brought into L1 105 are updated in L1 105 and L2 109.
   (D) The presence bits are updated (i.e., set to a second value to indicate presence of the cache-line) in L2 109 for the cache-line that is brought into L1 105.
   (E) The presence bits are unset/reset for the cache-line evicted from L1 105 (i.e., set to a first value to indicate absence of the cache-line in L1 105) to indicate that the cache-line is no longer present in L1 105.
   (F) CBI logic 110 concludes the data search in L2 109.

Further discussion of the optimized cache replacement policy is enhanced with the illustration of FIG. 9.

FIG. 9 illustrates the use of Pseudo LRU bits and presence bits in selecting cache-lines for eviction, according to one embodiment of the invention. L2 Cache 109, which is illustrated in FIGS. 4-7, is further described in FIG. 9 with a particular focus on presence bits 135. P0 912 is one element of presence bits 135. Also illustrated in L2 cache 109 is LRU group 906 comprised of cache-way A 402 and cache-way C 406 and MRU group 908 comprised of cache-way B 404 and cache-way D 408.

CBI logic 110 utilizes presence bits 135 to indicate the higher level caches within which a particular cache line is present. Unlike typical caches where only the LRU bits are used for selection of cache-lines for eviction, CBI logic 110 employs both LRU bits 407 and presence bits 135 in the process of selecting a cache-line for eviction. Conversely, in traditional LRU policy, the cache-line pointed to by LRU bits as being least recently used is evicted even if the corresponding presence bit indicates that the cache-line is present in a higher level (L1) cache.

In L2 cache 109, every cache-line is associated with Pseudo-LRU bits 407 and p presence bits (e.g., presence bits 135), where p is the number of processors. In the example of FIG. 9, "p" has a value of 4 in L2 cache 109. A presence bit of 1 indicates that the cache-line is present in the corresponding L1.

By incorporating presence bits 135 into eviction decisions, CBI logic 110 provides an optimized cache eviction policy. Pseudo-LRU partitions the "n" ways in a set into 2 groups: a more recently used (MRU) group (e.g., MRU 908); and a less recently used (LRU) group (e.g., LRU 906). The LRU group comprises all the ways in the set that are pointed to by the LRU bits (e.g., A 402, C 406). All other ways comprise the MRU group (e.g., B 404, D 408). For the purpose of cache eviction, CBI logic 110 selects from cache-lines that are in LRU group 906.

Referring again to the optimized cache replacement policy of FIG. 8, following a first cache miss in L1 105, CBI logic 110 responds to a second cache miss in L2 109 by utilizing presence bits (e.g., presence bits 135) in the eviction decision and implementing the pseudo-LRU policy. CBI logic 110 continues execution of the optimized cache eviction policy as described in the following enumerated steps:

(3) In response to a cache miss in L1 105 followed by a cache miss in L2 109:
 (A) The selection of the line to be evicted in the L2 set is made based on the following:
  (I) CBI logic 110 determines whether the Least Recently Used cache-line has the associated presence bit set (e.g., P0 912).
  (II) If the Least Recently Used cache-line (e.g., A 402) does not have the associated presence bit set:
   (IIa) CBI logic 110 selects the Least Recently Used cache-line for eviction; and
   (IIb) CBI logic 110 updates/modifies the LRU bits as described in the modification to LRU bits in response to a cache miss (illustrated in FIG. 6).
  (III) If CBI logic 110 previously determined that the Least Recently Used cache-line has the associated presence bit set, CBI logic 110 determines whether all (remaining) cache-lines in the LRU group have the corresponding presence bits set.
  (IV) If all cache-lines in LRU group 906 have the corresponding presence bits set:
   (IVa) CBI logic 110 selects the Least Recently Used cache-line for eviction; and
   (IVb) CBI logic 110 updates/modifies the LRU bits as described in the modification to LRU bits in response to a cache miss (illustrated in FIG. 6).
  (V) If CBI logic 110 previously determined that the Least Recently Used cache-line has the associated bit set and all (remaining) cache-lines in the LRU group do not have the corresponding presence bits set:
   (Va) CBI logic 110 randomly selects a cache-line from LRU group 906 that does not have a corresponding presence bit set; and
   (Vb) CBI logic 110 updates/modifies the LRU bits as described in the modification to LRU bits in response to (a) a cache hit on a less recently used cache-line of a way pair, wherein the cache hit does not occur in the least recently used cache-line or (b) eviction of a cache-line from LRU group 906, wherein the least recently used cache-line is not evicted (illustrated in FIG. 7).
 (B) CBI logic 110 inspects the presence bit for the evicted line in L2 109.
  (I) If the evicted cache-line is present in any L1, the evicted cache-line is invalidated in the L1(s) to maintain the inclusive policy.
  (II) If the evicted cache-line is not present in any L1, then no back-invalidates are sent to the L1(s). A cache-line is evicted from the requesting core's L1 using LRU policy of L1, to make space for the incoming line.
 (C) Once a cache-line is evicted from both L1 105 and L2 109, the new line is brought into L1 105, L2 109 and internal core registers.
 (D) The presence bits, LRU bits and state bits for the new cache-line are appropriately set in L1 and L2 109.

FIG. 10 is a flow chart illustrating the method by which the above process of the illustrative embodiment is completed. In particular, FIG. 10 is a flow chart illustrating the process of executing cache replacement and back-invalidation policies that incorporate the use of presence bits. Although the method illustrated in FIG. 10 may be described with reference to components shown in FIG. 1 and FIGS. 3-9, it should be understood that this is merely for convenience and alternative components and/or configurations thereof can be employed when implementing the various methods. Key portions of the methods may be completed by CBI logic 110 executing within processor 101 and specifically located within cache controller 112(FIG. 1) and controlling specific operations of/on processor 101, and the methods are thus described from the perspective of either/both CBI logic 110 and processor 101.

The process of FIG. 10 begins at initiator block 1002 and proceeds to block 1004, at which CBI logic 110 detects a read request. At block 1006, CBI logic 110 detects a cache miss in L2 109. CBI logic 110 selects a cache-line for eviction from LRU group 906 based on the values of presence bits 135 (as explained within the description of FIG. 9), as shown at block 1008. CBI logic 110 initiates eviction of an L2 cache-line, as shown at block 1010. At block 1012, CBI logic 110 initiates appropriate back-invalidations. A new cache-line is brought in to L1(s) and L2 109, as shown at block 1014. The presence bits, LRU bits and state bits are appropriately set in L1(s) and L2 109, as shown at block 1016. The process ends at block 1018.

Although the invention is described with respect to a level 2 cache, the invention applies to any cache level which maintains presence bits to indicate the presence of a cache-line at a higher level of cache. Also, though described with respect to using a pseudo-LRU replacement policy as the base replacement policy, the invention may be similarly extended to any other replacement policy (even non-LRU based policies). The invention uses the presence bits to avoid replacing a line that is still present in a higher level cache. Further, though the invention refers to selection of a replacement candidate from the LRU group (less recently used lines) as one embodiment, in another embodiment, a replacement candidate may be selected from a group of cache-lines within the LRU to MRU order, if the cache-line does not have presence bits set.

The invention places a higher priority during the cache eviction process on a line in a lower level cache (L2) which is stored in any of the higher level caches (L1s) than a line which is not. Further, given that a line present in any higher level cache is more important than a line that is not present in any of the higher level caches, the invention ensures that stale/dormant lines in the higher level caches do not continue to keep the corresponding presence bits set in the lower level caches. In particular, the processor cores first unset/reset the presence bits in the lower level cache when a line is replaced in the higher level cache. Secondly, when a processor core goes idle (e.g., completes running a particular program), the core invalidates all the lines in corresponding higher level cache (for example, the L1 cache). Thus, the corresponding presence bits in the lower level cache (for example L2) are unset/reset, preventing those stale lines in the higher level cache from unnecessarily retaining space in the lower level cache.

Though the invention is described with reference to presence bits and, in particular, to one presence bit per higher level cache that shares the lower level cache (which maintains the presence bits), the invention applies to any other type of presence indicators. For example, to reduce the overhead of presence bits, coarser vectors may be used in designs embodying the invention. With coarser vectors, a single presence bit indicates the presence of the line in, potentially, more than one higher level cache. Although the unsetting/resetting of presence bits in the lower level cache on a replacement in the higher level cache is more complex with coarser vectors, the invention, which focuses on the application of presence bits/indicators to eviction decisions, may be applied to designs with coarser vectors as well.

In the flow charts above, one or more of the methods are described as a series of steps that are performed in a data processing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system having one or more processors and multiple levels of cache, including a lower level cache and a higher level cache, a method comprising:
   detecting a data request at the lower level cache;
   in response to a cache miss in the lower level cache, selecting a cache-line for eviction based upon (a) presence bits and (b) less recently used (LRU) bits;
   determining whether a copy of the cache-line selected for eviction is present in the higher level cache;
   in response to the copy of the cache-line selected for eviction being present in the higher level cache, invalidating the copy of the cache-line selected for eviction; and updating pseudo-LRU bits, wherein said invalidating further comprises:
      in response to the selection of the cache-line for eviction from the lower level cache: determining whether one or more copies of the cache-line selected for eviction is present in one or more higher level caches based on an inspection of a presence bit in the lower level cache associated with the selected cache-line; in response to the one or more copies of the selected cache-line being present in corresponding higher level caches, invalidating the one or more copies in corresponding lower level caches to maintain an inclusive policy;
      in response to no copies of the selected cache-line being present in corresponding higher level caches, evicting a cache-line from a requesting core's higher level cache using LRU policy for higher level caches in order to make space for a new incoming cache-line;
      in response to the eviction of cache-lines from one or more higher level caches and the lower level cache: placing new lines into (a) the one or more higher level caches, (b) the lower level cache, and (c) internal core registers; and setting (a) the respective presence bits in the one or more higher level caches to a second value and (b) the respective LRU bits and state bits in the corresponding one or more higher level caches and the lower level cache, appropriately; and
      in response to a replacement of a cache-line in a higher level cache, re-setting the corresponding presence bit in the lower level cache to a first value.

2. The method of claim 1, wherein said selecting further comprises:
   partitioning multiple "cache-ways" of a cache set into a less recently used (LRU) group and a more recently used (MRU) group using one or more of (a) pseudo-LRU bits; and (b) non-LRU based replacement policy parameters;
   in response to a cache miss in the lower level cache, initiating a process to determine which cache line is consequently selected for eviction in the lower level cache, based on values of one or more of: (a) a presence bit; (b) a LRU bit or a pseudo LRU bit; and (c) parameters from non-LRU based replacement policies, wherein the initiating comprises:
      (a) checking the value of the presence bits;
      (b) in response to the value of the presence bits being set to the first value, receiving an indication that a copy of the cache-line is not present in a corresponding higher level cache; and
      (c) in response to the value of the presence bits being set to the second value, receiving an indication that a copy of the cache-line is present in the corresponding higher level cache;
   identifying a least recently used cache-line in said lower level cache using said pseudo-LRU bits;

in response to the least recently used cache-line not having a corresponding presence bit set to the second value or a group of cache-lines constituting the LRU group not having the corresponding presence bits set to the second value, executing one or more of: (a) a selection of the least recently used cache-line for eviction; (b) replacement of the least recently used cache-line with a new cache-line; and (c) a change to the LRU bits; and in response to the least recently used cache-line having a corresponding presence bit set to the second value and one or more elements of the LRU group not having the corresponding presence bit set to the second value, executing one or more of: (a) a random selection of a less recently used cache-line from the LRU group for eviction, wherein said less recently cache-line that is randomly selected is not the least recently used cache-line; (b) replacement of said less recently used cache-line with a new cache-line; and (c) a modification of the LRU bits.

3. The method of claim 1, wherein:

said updating further comprises: in response to (a) a cache hit within a LRU group, wherein said cache hit does not occur in a least recently used cache-way or (b) the eviction of a cache-line from the LRU group followed by a replacement of the evicted cache-line with a new cache-line, wherein the least recently used cache-line is not evicted, modifying a first level-1 LRU bit value to a current level-1 LRU bit value to (a) indicate that a first cache-way corresponding to the cache hit or the replacement of the evicted cache-line with the new cache-line is currently a member of a more recently used (MRU) group and is no longer a member of the LRU group and (b) identify a second cache-way which replaces the first cache-way as a member of the LRU group;

said method further comprising: in response to a cache miss, determining whether to evict the cache-line in the least recently used way by using one or more of presence bits, LRU bits and a cache level location of the cache miss; in response to said cache-line in said least recently used cache-way being selected for eviction: replacing the evicted cache-line with a new cache-line; switching one or more corresponding higher level LRU bit values to indicate the modified and current designation of one or more cache-way pairs, as a result of the eviction of the least recently used cache-line, wherein said current designation is defined for one or more pairs as (a) more recently used (MRU) pairs or (b) less recently used (LRU) pairs; changing lower level LRU bit values to: (a) indicate that a cache-way previously containing the least recently used cache-line and currently containing the new cache-line is currently a more recently used cache way within a MRU group; (b) identify a cache-line as a currently designated LRU cache-line as a result of a replacement of the previously designated least recently used cache-line of a LRU group; and in response to a cache hit in a MRU group, maintaining a same set of values of the LRU bits.

4. The method of claim 1, further comprising: in response to a processor core initiating a process to attain an idle status, invalidating the higher level cache associated with said processor core in order to re-set presence bits in the lower level cache to corresponding first values, wherein said process is selected from among processes which include a process to conclude an execution of a particular program.

5. A data processing system comprising:
one or more processors;
a cache memory system hierarchically organized into multiple levels including a highest level having one or more level 1 (L1) caches and a lower adjacent level having one or more level 2 (L2) caches, wherein the level 1 cache is dedicated to one processor core or shared by multiple processor cores;
a cache controller;
logic which executes on a processor and causes the processor to:
detect a data request at the lower level cache; in response to a cache miss in the lower level cache: select a cache-line for eviction based upon (a) presence bits and (b) less recently used (LRU) bits; determine whether a copy of the cache-line selected for eviction is present in a higher level cache; in response to the copy of the cache-line selected for eviction being present in the higher level cache, invalidate the copy of the cache-line selected for eviction; and update pseudo-LRU bits;
wherein said logic that causes the processor to invalidate the copy of the cache-line further comprises logic that causes the system to:
in response to the selection of the cache-line for eviction from the lower level cache: determine whether one or more copies of the cache-line selected for eviction is present in one or more higher level caches based on an inspection of the presence bit in the lower level cache associated with the selected cache-line;
in response to the one or more copies of the selected cache-line being present in corresponding higher level caches, invalidate the one or more copies in corresponding lower level caches to maintain an inclusive policy;
in response to no copies of the selected cache-line being present in corresponding higher level caches, evict a cache-line from a requesting core's higher level cache using LRU policy for higher level caches in order to make space for a new incoming cache-line;
in response to the eviction of cache-lines from one or more higher level caches and the lower level cache: placing new lines into (a) the one or more higher level caches, (b) the lower level cache, and (c) internal core registers; and set (a) the respective presence bits in the one or more higher level caches to a second value and (b) the respective LRU bits and state bits in the corresponding one or more higher level caches and the lower level cache, appropriately; and
in response to a replacement of a cache-line in a higher level cache, re-set the corresponding presence bit in the lower level cache to a first value.

6. The data processing system of claim 5, wherein said logic that causes the processor to select the cache line for eviction further comprises logic that causes the processor to:
partition multiple "cache-ways" of a cache set into a less recently used (LRU) group and a more recently used (MRU) group using one or more of: (a) pseudo-LRU bits; and (b) non-LRU based replacement policy parameters; in response to a cache miss in the lower level cache, initiate a process to determine which cache line is consequently selected for eviction in the lower level cache, based on values of one or more of: (a) a presence bit; (b) a LRU bit or a pseudo LRU bit; and (c) parameters from non-LRU based replacement policies; wherein the processor initiating comprises: (a) checking the value of the presence bits; (b) in response to the value of the presence bits being set to the first value, receiving an indication that a copy of the cache-line is not present in a corresponding higher level cache; (c) in response to the value of the presence bits being set to the second value, receiving an indication that a copy of the cache-line is present in the corresponding higher level cache; identifying a least recently used cache-line in said lower level cache using said pseudo-LRU bits; in response to the least recently used cache-line not having a corresponding presence bit set to the second value or a group of cache-lines constituting the LRU group does have the corresponding presence bits set to the second value, executing one or more of: (a) a selection of the least recently used cache-line for eviction; (b) replacement of the least recently used cache-line with a new cache-line; and (c) a change to the LRU bits; and in response to the least recently used cache-line having a corresponding presence bit set to the second value and one or more elements of the LRU group not having the corresponding presence bit set to the second value, executing one or more of: (a) a random selection of a less recently used cache-line from the LRU group for eviction, wherein said less recently cache-line that is randomly selected is not the least recently used cache-line; (b) replacement of said less recently used cache-line with a new cache-line; and (c) a modification of the LRU bits.

7. The data processing system of claim 5, wherein said functions for updating further comprises function for:
in response to (a) a cache hit within a LRU group, wherein said cache hit does not occur in a least recently used cache-way or (b) the eviction of a cache-line from the LRU group followed by a replacement of the evicted cache-line with a new cache-line, wherein the least recently used cache-line is not evicted, modifying a first level-1 LRU bit value to a current level-1 LRU bit value to (i) indicate that a first cache-way corresponding to the cache hit or the replacement of the evicted cache-line with the new cache-line is currently a member of a more recently used (MRU) group and (ii) identify a second cache-way which replaces the first cache-way as a member of the LRU group; in response to the cache-line in the least recently used cache-way being selected for eviction: replacing the evicted cache-line with a new cache-line; switching one or more corresponding higher level LRU bit values to indicate the modified and current designation of one or more cache-way pairs, as a result of the evicted cache-line, wherein said current designation is defined for one or more pairs as (a) more recently used (MRU) pairs or (b) less recently used (LRU) pairs; changing lower level LRU bit values to: (a) indicate that a cache-way previously containing the least recently used cache-line and currently containing the new cache-line is currently a more recently used cache way within a MRU group; (b) identify a cache-line as a currently designated LRU cache-line as a result of a replacement of the previously designated least recently used cache-line of a LRU group; and in response to a cache hit in a MRU group, maintaining a same set of values of the LRU bits.

8. The data processing system of claim 5, further comprising logic that causes the processor to:
in response to a processor core initiating a process to attain an idle status, invalidates the higher level cache associated with said processor core in order to re-set presence bits in the lower level cache to corresponding first values, wherein said process is selected from among processes which include a process to conclude an execution of a particular program.

9. A processor chip comprising:
one or more processors each having a higher level cache;
a lower level cache associated with one or more higher level caches; and
a cache controller which includes logic that:
detects a data request at the lower level cache;
in response to a cache miss in the lower level cache, selects a cache-line for eviction based upon (a) presence bits and (b) less recently used (LRU) bits;
determines whether a copy of the cache-line selected for eviction is present in the higher level cache of at least one of the one or more processors;
in response to the copy of the cache-line selected for eviction being present in the higher level cache, invalidates the copy of the cache-line selected for eviction; and
updates pseudo-LRU bits;
wherein said logic that causes invalidates further comprises logic that:
in response to the selection of the cache-line for eviction from the lower level cache: determines whether one or more copies of the cache-line selected for eviction is present in one or more higher level caches based on an inspection of the presence bit in the lower level cache associated with the selected cache-line; in response to the one or more copies of the selected cache-line being present in corresponding higher level caches, invalidates the one or more copies in corresponding lower level caches to maintain an inclusive policy; in response to no copies of the selected cache-line being present in corresponding higher level caches, evicts a cache-line from a requesting core's higher level cache using LRU policy for higher level caches in order to make space for a new incoming cache-line; in response to the eviction of cache-lines from one or more higher level caches and the lower level cache: places new lines into (a) the one or more higher level caches, (b) the lower level cache and (c) internal core registers; and sets (a) the respective presence bits in the one or more higher level caches to a second value and (b) the respective LRU bits and state bits in the corresponding one or more higher level caches and the lower level cache, appropriately; and in response to a replacement of a cache-line in a higher level cache, re-sets the corresponding presence bit in the lower level cache to a first value.

10. The processor chip of claim 9, wherein said logic that causes the controller to select further comprises logic that causes the controller to:
partition multiple "cache-ways" of a cache set into a less recently used (LRU) group and a more recently used (MRU) group using one or more of: (a) pseudo-LRU bits; and (b) non-LRU based replacement policy parameters;
in response to a cache miss in the lower level cache, initiate a process to determine which cache line is consequently selected for eviction in the lower level cache, based on values of one or more of (a) a presence bit; (b) a LRU bit or a pseudo LRU bit; and (c) parameters from non-LRU based replacement policies, wherein the logic that initiates comprises that:

(a) checks the value of the presence bits; (b) in response to the value of the presence bits being set to the first value, receives an indication that a copy of the cache-line is not present in a corresponding higher level cache; (c) in response to the value of the presence bits being set to the second value, receives an indication that a copy of the cache-line is present in the corresponding higher level cache; identifies a least recently used cache-line in said lower level cache using said pseudo-LRU bits; in response to the least recently used cache-line goes-not having a corresponding presence bit set to the second value or a group of cache-lines constituting the LRU group having the corresponding presence bits set to the second value, executes one or more of—(a) a selection of the least recently used cache-line for eviction; (b) replacement of the least recently used cache-line with a new cache-line; and (c) a change to the LRU bits; and in response to the least recently used cache-line having a corresponding presence bit set to the second value and one or more elements of the LRU group not having the corresponding presence bit set to the second value, executes one or more of: (a) a random selection of a less recently used cache-line from the LRU group for eviction, wherein said less recently cache-line that is randomly selected is not the least recently used cache-line; (b) replacement of said less recently used cache-line with a new cache-line; and (c) a modification of the LRU bits.

11. The processor chip of claim 9, wherein said logic that updates further comprises logic that:

in response to (a) a cache hit within a LRU group, wherein said cache hit does not occur in a least recently used cache-way or (b) the eviction of a cache-line from the LRU group followed by a replacement of the evicted cache-line with a new cache-line, wherein the least recently used cache-line is not evicted, modifying a first level-1 LRU bit value to a current level-1 LRU bit value to (i) indicate that a first cache-way corresponding to the cache hit or the replacement of the evicted cache-line with the new cache-line is currently a member of a more recently used (MRU) group and (ii) identify a second cache-way which replaces the first cache-way as a member of the LRU group; in response to the cache-line in the least recently used cache-way is selected for eviction: replacing the evicted cache-line with a new cache-line; switching one or more corresponding higher level LRU bit values to indicate the modified and current designation of one or more cache-way pairs, as a result of the evicted cache-line, wherein said current designation is defined for one or more pairs as (a) more recently used (MRU) pairs or (b) less recently used (LRU) pairs; changing lower level LRU bit values to: (a) indicate that a cache-way previously containing the least recently used cache-line and currently containing the new cache-line is currently a more recently used cache way within a MRU group; (b) identify a cache-line as a currently designated LRU cache-line as a result of a replacement of the previously designated least recently used cache-line of a LRU group; and in response to a cache hit in a MRU group, maintaining a same set of values of the LRU bits.

12. The processor chip of claim 9, further comprising logic that: in response to a processor core initiating a process to attain an idle status, invalidates the higher level cache associated with said processor core in order to re-set presence bits in the lower level cache to corresponding first values, wherein said process is selected from among processes which include a process to conclude an execution of a particular program.

\* \* \* \* \*